United States Patent
Kasahara

(10) Patent No.: US 8,681,214 B2
(45) Date of Patent: Mar. 25, 2014

(54) METHOD AND APPARATUS FOR IMAGE PROCESSING AND ON-VEHICLE CAMERA APPARATUS

(75) Inventor: Ryosuke Kasahara, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 275 days.

(21) Appl. No.: 12/998,999

(22) PCT Filed: Dec. 10, 2009

(86) PCT No.: PCT/JP2009/071007
§ 371 (c)(1),
(2), (4) Date: Jun. 22, 2011

(87) PCT Pub. No.: WO2010/073953
PCT Pub. Date: Jul. 1, 2010

(65) Prior Publication Data
US 2011/0254947 A1    Oct. 20, 2011

(30) Foreign Application Priority Data
Dec. 24, 2008   (JP) .................... 2008-327986

(51) Int. Cl.
*H04N 7/18* (2006.01)
(52) U.S. Cl.
USPC ........................................ 348/135
(58) Field of Classification Search
USPC ........................................ 348/135
See application file for complete search history.

(56) References Cited

U.S. PATENT DOCUMENTS

| | | | |
|---|---|---|---|
| 6,603,885 B1 | 8/2003 | Enomoto | |
| 2002/0196472 A1 | 12/2002 | Enomoto | |
| 2003/0031375 A1 | 2/2003 | Enomoto | |
| 2003/0118248 A1* | 6/2003 | Kyong | 382/266 |
| 2007/0115384 A1 | 5/2007 | Furukawa | |
| 2009/0135277 A1 | 5/2009 | Kasahara | |
| 2009/0190008 A1 | 7/2009 | Kasahara | |
| 2009/0190855 A1 | 7/2009 | Kasahara | |

(Continued)

FOREIGN PATENT DOCUMENTS

| | | |
|---|---|---|
| CN | 1819617 | 8/2006 |
| JP | 2006211218 A | 8/2006 |

(Continued)

OTHER PUBLICATIONS

Abstract of JP 2007-148500 published Jun. 14, 2007.

(Continued)

*Primary Examiner* — Dave Czekaj
*Assistant Examiner* — Mohammad J Rahman
(74) *Attorney, Agent, or Firm* — Harness, Dickey & Pierce, P.L.C.

(57) ABSTRACT

An image processing apparatus that includes an edge-enhancement filter that enhances sharpness of an image is provided. The edge-enhancement filter includes distance calculators that calculate values of a distance between a target pixel and an optical center of a captured image in two or more axial directions, edge detection filters that detect edge amounts in two directions, multipliers that multiplies each of the edge amounts detected by the edge detection filters by one of the distance values of a corresponding one of the axial directions, a first adder that adds outputs of the multipliers together, and a second adder that adds a pixel value of the target pixel and an output of the first adder. A coring unit can be interposed between the first adder and the second adder if necessary.

19 Claims, 12 Drawing Sheets

(56) References Cited

U.S. PATENT DOCUMENTS

| | | |
|---|---|---|
| 2009/0201417 A1 | 8/2009 | Kasahara |
| 2009/0202171 A1 | 8/2009 | Kasahara |
| 2009/0226086 A1 | 9/2009 | Kasahara |
| 2009/0231416 A1 | 9/2009 | Kasahara |
| 2009/0231472 A1 | 9/2009 | Kasahara |
| 2009/0238455 A1 | 9/2009 | Kasahara |
| 2010/0002105 A1 | 1/2010 | Kasahara |

FOREIGN PATENT DOCUMENTS

| | | |
|---|---|---|
| JP | 2006246080 A | 9/2006 |
| JP | 2007148500 A | 6/2007 |
| JP | 2008294991 A | 12/2008 |
| JP | 2009-212818 A | 9/2009 |

OTHER PUBLICATIONS

Abstract of JP 2009-212818 published Sep. 17, 2009.
Abstract of JP 2008-294991 published Dec. 4, 2008.
Abstract of JP 2006-246080 published Sep. 14, 2006.
Abstract of JP 2006-211218 published Aug. 10, 2006.
International Search Report.
Extended European Search Report dated Oct. 4, 2013 issued in corresponding European Application No. 098324756.0.
Mar. 11, 2013 Chinese Office Action issued in CN 2009-80152171.3 (with translation).

* cited by examiner

| 0 | -0.5 | 0 | -0.5 | 0 |
|---|---|---|---|---|
| -0.5 | 0 | -1.0 | 0 | -0.5 |
| 0 | -1.0 | 9.0 | -1.0 | 0 |
| -0.5 | 0 | -1.0 | 0 | -0.5 |
| 0 | -0.5 | 0 | -0.5 | 0 |

US 8,681,214 B2

METHOD AND APPARATUS FOR IMAGE PROCESSING AND ON-VEHICLE CAMERA APPARATUS

CROSS-REFERENCE TO RELATED APPLICATIONS

This is a National Phase Application of PCT/JP2009/071007, filed Dec. 10, 2009, and claims priority under 35 U.S.C. §119 to, Japanese Application No. 2008-327986, filed Dec. 24, 2008.

TECHNICAL FIELD

The present invention is generally directed to an apparatus and method for image processing that processes an image obtained by using a wide-view-angle optical system and to an on-vehicle camera apparatus that includes the image processing apparatus.

BACKGROUND ART

A high-frequency enhancement filter (edge enhancement filter) has conventionally been used to correct degradation in resolution caused by an optical system, such as a lens, and frequency characteristics after distortion correction.

Meanwhile, when an image is captured by using an optical system, depending on the optical system used, the resolution of the image decreases as one goes toward the perimeter, i.e., away from an optical center of the optical system. To this end, Japanese Patent Application Laid-open No. 2007-148500, for example, discloses use of a high-frequency enhancement filter. In this high-frequency enhancement filter, the filter coefficient is changed depending on the distance from the image-frame center so as to perform wider-range enhancement toward the perimeter of the image frame.

Considerably strong omnidirectional edge enhancement has been required to increase the strength of high-frequency enhancement (edge enhancement) in a perimeter portion of an image frame by using a conventional uniform, direction-independent filter. This produces a side effect that the noise is amplified greatly.

A fixed-coefficient filter can be implemented by means of bit shifters and adders. In contrast, the configuration for causing an image frame to have different filter coefficients at different portions of the image frame requires a large number of multipliers, resulting in massive circuit scale. This makes the configuration to be less appropriate in certain cases, such as use as on-vehicle equipment, where the configuration should operate even at low power.

The present invention aims to solve the above issues in the conventional technology.

DISCLOSURE OF INVENTION

According to an aspect of the present invention, there is provided an image processing apparatus that includes edge-enhancement filter means for enhancing sharpness of an image. The edge-enhancement filter means includes distance calculating means for calculating distance values, which are values of a distance between a target pixel and an optical center of a captured image in at least two axial directions; an edge detection filter corresponding to each of the axial directions, each of the edge detection filter configured to detect an edge amount in a corresponding one of at least two directions on an direction-by-direction basis; multiplying means corresponding to each of the edge detection filters, each of the multiplying means for multiplying the edge amount detected at a corresponding one of the edge detection filters by the distance value calculated at the distance calculating means for a corresponding one of the axial directions; first adding means for adding outputs of the multiplying means together; and second adding means for adding a pixel value of the target pixel to an output of the first adding means.

According to an aspect of the present invention, correction for an optical system that causes resolution to decrease at perimeter of an image frame can be performed with circuit and processing of relatively small scale. Simultaneously with this, noise amplification can also be suppressed. In addition, edge enhancement can be performed not only to the peripheral portion of an image frame but also to its center portion.

BEST MODE(S) FOR CARRYING OUT THE INVENTION

Exemplary embodiments of the present invention are described in detail below with reference to the accompanying drawings. One embodiment of the present invention provides an image capturing apparatus that captures an image of a subject by using a wide-view-angle optical system with large magnification chromatic aberration and high distortion occur. The image capturing apparatus includes an image processing system that performs, in addition to MTF correction, correction of the magnification chromatic aberration, correction of the distortion, and the like. It is needless to say that the configuration is not limited to this.

Moreover, in the following explanation, it is assumed that an image is composed of additive primary colors, i.e., red (R), green (G), and blue (B). It is needless to say that the present invention can be applied to a case where an image is composed of subtractive primary colors, i.e., yellow (Y), magenta (M), and cyan (C).

Figure 1:
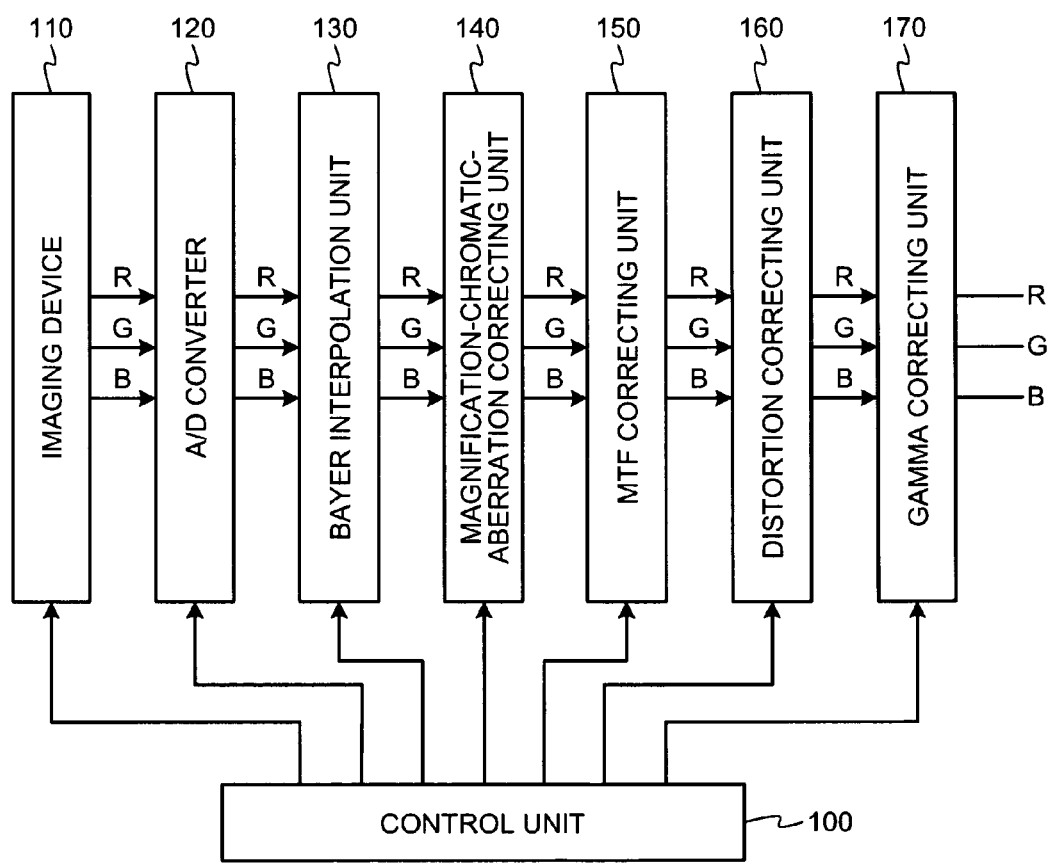
FIG. 1 is a block diagram illustrating the overall configuration of an image capturing apparatus according to an embodiment of the present invention.

FIG. 1 is a functional block diagram of an image processing system in the image capturing apparatus according to an embodiment of the present invention. The image capturing apparatus further externally includes an operating unit, an image storage unit, and an image display unit (monitor), which are not shown in FIG. 1. It is assumed that the image capturing apparatus is used as an on-vehicle camera apparatus. It is needless to say that the image capturing apparatus can be used in some other way.

The image capturing apparatus includes a control unit 100. The control unit 100 supplies control signals (clock, lateral/longitudinal synchronization signal, and others) to all the other units of the image capturing apparatus. That is, the control unit 100 controls operations of all the other units in pipeline.

The image capturing apparatus includes an imaging device 110. The imaging device 110 includes elements, e.g., a charge-coupled device (CCD) or a complementary metal oxide semiconductor (CMOS) sensor and converts an optical image captured by using a wide-angle optical system (not shown) into electric signals (pixel signals). The wide-angle optical system has large magnification aberration and distortion. The imaging device 110 further includes a Bayer-array color filter and sequentially outputs RGB pixel signals in a Bayer array according to coordinate values (x, y) fed from the control unit 100. The control unit 100 also sequentially feeds the coordinate values (x, y), which it feeds to the imaging device 110, to the units arranged at a subsequent stage of the control unit 100 with a predetermined time lag.

In an alternative configuration, instead of the control unit 100, the imaging device 110 generates the coordinate values (x, y) in response to reception of clock and lateral/longitudinal synchronization signals and sequentially feeds them to the units arranged at a subsequent stage of the control unit 100.

The image capturing apparatus includes an analog-to-digital (A/D) converter 120 at a subsequent stage of the control unit 100. The Bayer-array RGB image signals output from the imaging device 110 are analog signals. The A/D converter 120 converts the analog Bayer-array RGB image signals into digital signals (pixel data). Each of the digital signals is a signal with, for example, 8 bits per color of RGB. An automatic gain control (AGC) circuit is typically provided at a previous stage of the A/D converter 120; however, description thereof is omitted.

The image capturing apparatus includes a Bayer interpolation unit 130 at a subsequent stage of the A/D converter 120. The Bayer interpolation unit 130 receives the digital Bayer-array RGB image signal (pixel data), generates pixel data for all coordinate positions by performing linear interpolation on an individual color basis of RGB.

Although, in the present embodiment, the imaging device has been discussed as including the Bayer-array color filter, the present embodiment is also effective for an imaging device that includes a color filter of another arrangement, such as another CMYG array or an RGB-and-infrared-ray (Ir) array. Particularly, an imaging device that includes such a color filter that has a four-color array as mentioned earlier requires, as compared to a type of three colors such as RGB, a memory of lower latency or a 4-port random access memory (RAM) for correction of magnification chromatic aberration.

The image capturing apparatus includes a magnification-chromatic-aberration correcting unit 140 at a subsequent stage of the Bayer interpolation unit 130. The magnification-chromatic-aberration correcting unit 140 receives the Bayer-interpolated R, G, and B pixel data, performs coordinate transformation (coordinate transformation for magnification chromatic aberration) on an individual chrominance component basis of RGB by using a predetermined polynomial, and outputs RGB pixel data having undergone the magnification chromatic aberration correction. As will be mentioned later, the coordinate transformation for correcting the magnification chromatic aberration can be performed by using a memory that has a relatively small capacity and low latency or a memory (e.g., a static random access memory (SRAM)) that has a relatively small capacity and a plurality of ports.

The image capturing apparatus includes an MTF correcting unit 150 at a subsequent stage of the magnification-chromatic-aberration correcting unit 140. The MTF correcting unit 150 receives the RGB pixel data having undergone the magnification chromatic aberration correction and performs MTF correction, which is high-frequency enhancement filtering, on a luminance signal of the RGB pixel data and outputs RGB pixel data having undergone the MTF correction. The present invention is generally directed to this MTF correcting unit 150. As will be mentioned later, the configuration according to the present invention allows to increase the strength of high-frequency enhancement toward ends of an image frame with a circuit of relatively small scale. It is also allowed to perform strong edge enhancement specifically in a tangential direction from an image-frame center where optical resolution is likely to be low.

The image capturing apparatus includes a distortion correcting unit 160 at a subsequent stage of the MTF correcting unit 150. The distortion correcting unit 160 receives the RGB pixel data having undergone the magnification chromatic aberration correction and the MTF correction, performs coordinate transformation (coordinate transformation for distortion) of the RGB chrominance components collectively by using a predetermined polynomial or the like, and outputs RGB pixel data having undergone the distortion correction. As will be mentioned later, a memory for use in the coordinate transformation for the distortion correction desirably has a larger capacity (by one image frame at maximum) than a memory for use in the magnification chromatic aberration correction; however, the number of ports required of the memory for correcting the distortion is one. Therefore, as this memory, a memory (dynamic random access memory (DRAM) or the like) of high latency can be used.

The image capturing apparatus includes a gamma correcting unit 170 at a subsequent stage of the distortion correcting unit 160. The gamma correcting unit 170 receives the RGB pixel data output from the distortion correcting unit 160, performs predetermined gamma correction on the data by using lookup tables or the like on an individual color basis of RGB, and outputs RGB pixel data having undergone the gamma correction. The pixel data output from the gamma correcting unit 170 is monitor-displayed on a display unit (not shown).

The image capturing apparatus having the configuration illustrated in FIG. 1 can provide a high-image-quality imaging system that is of low cost and with circuit of relatively small scale although the imaging system employs an optical system with chromatic magnification aberration and distortion, and produces an image of which image quality (resolution) is relatively low in its perimeter. Meanwhile, the magnification-chromatic-aberration correcting unit 140 can be replaced with a magnification-chromatic-aberration-and-distortion correcting unit that corrects magnification chromatic aberration and distortion simultaneously. When such a magnification-chromatic-aberration-and-distortion correcting unit is employed, the distortion correcting unit 160 becomes unnecessary. The gamma correcting unit 170 can be arranged at an immediately subsequent stage of the Bayer interpolation unit 130.

Specific exemplary configurations of the magnification-chromatic-aberration correcting unit 140, the MTF correcting unit 150, and the distortion correcting unit 160 will be described in detail below.

Prior to giving a detailed description about the magnification-chromatic-aberration correcting unit 140 and the distortion correcting unit 160, principles of magnification chromatic aberration correction and distortion correction will be described.

Figure 2:
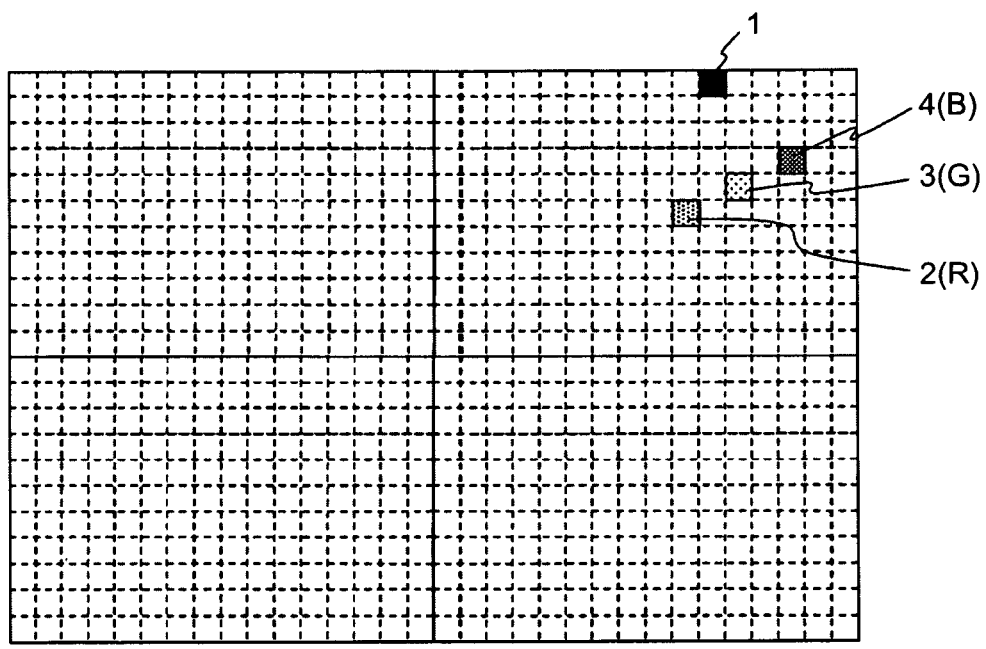
FIG. 2 is a diagram for explaining magnification chromatic aberration and distortion.

As schematically illustrated in FIG. 2, when an image is captured by using an optical system and when magnification chromatic aberration and distortion occurs, pixel data pertaining to an original position (pixel) at the upper right of an image frame indicated by 1 is shifted from this original position due to distortion, and further shifted differently among different chrominance components of RGB due to magnification chromatic aberration. Accordingly, an R component, a G component, and a B component actually imaged by the imaging device are shown in FIG. 2 as 2(R), 3(G), and 4(B), respectively. Magnification chromatic aberration correction and distortion correction can be performed by copying the pixel data pertaining to the RGB chrominance components at the positions (pixels) of 2(R), 3(G), 4(B) to the position (pixel) of 1, which is the original position; i.e., by performing coordinate transformation. In performing the coordinate transformation, the positions 2, 3, and 4 are employed as coordinate-transformation source coordinates while the position 1 is employed as coordinate-transformation target coordinates.

The amount of distortion and the amount of magnification chromatic aberration can be obtained from design data of the optical system; and it is therefore possible to calculate amounts of shifts of the RGB chrominance components relative to the original position.

Figure 3:
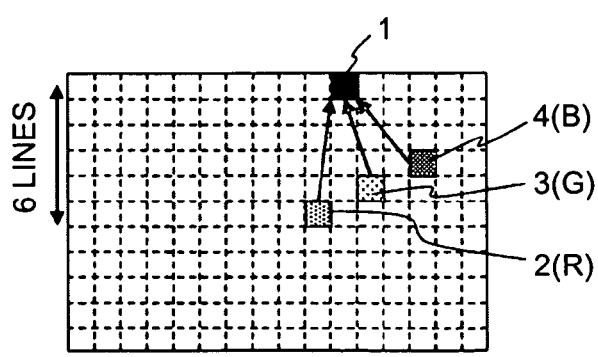
FIG. 3 is a diagram for explaining simultaneous correction of magnification chromatic aberration and distortion.

FIG. 3 is a schematic for explaining a method for correcting magnification chromatic aberration and distortion simultaneously. Specifically, the magnification chromatic aberration and distortion can be corrected simultaneously by copying the pixel data pertaining to the RGB chrominance components at the positions (pixels) of 2(R), 3(G), and 4(B) to the position (pixel) of 1, which is the original position; in other words, by performing coordinate transformation. However, this method is disadvantageous in that in this method it is necessary to provide a memory that has relatively large capacity and any one of low latency and multiple ports for each of RGB. For example, in the example illustrated in FIG. 3, a fast, 6-line memory becomes necessary for each of RGB to perform the coordinate transformation.

Figure 4A:
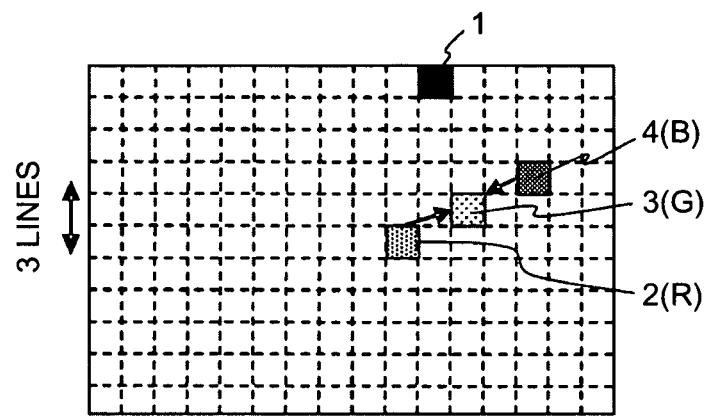
FIGS. 4A and 4B are diagrams explaining independent correction of magnification chromatic aberration and distortion.
Figure 4B:
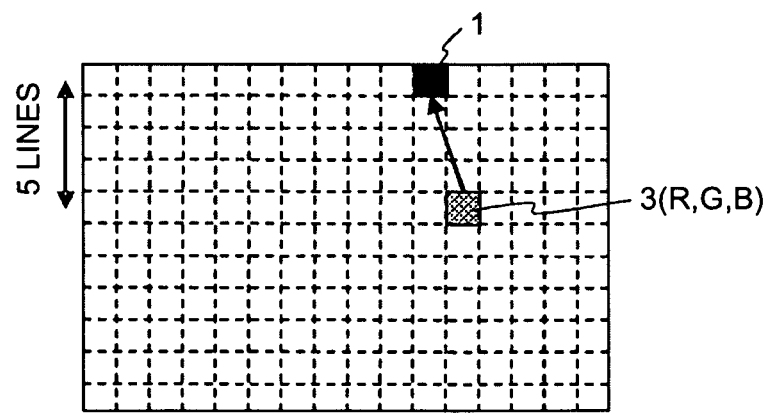

FIGS. 4A and 4B are schematics for explaining the methods for correcting magnification chromatic aberration and distortion independently. Although magnification chromatic aberration occurs at shift amounts that differ among different chrominance components, the shift amounts are relatively small. In contrast, distortion occurs with a relatively large shift amount but the shift amount is same for the different chrominance components. With an attention focused on this, coordinate transformation of pixel data is performed on an individual chrominance component basis of RGB (in the example to be mentioned later, RB chrominance components are subjected to coordinate transformation and copied to the position of G component) to correct magnification chromatic, aberration; thereafter, the RGB pixel data having undergone the magnification chromatic aberration correction is subjected, as one set of data, to coordinate transformation for distortion correction. This method allows to separately use memories for use in the coordinate transformation for magnification chromatic aberration correction and for the coordinate transformation for distortion correction. More concretely, it is possible to use a fast (low-latency or with multiple ports), small-capacity memory that is for RGB for use in the coordinate transformation for magnification chromatic aberration correction and use a slow (high-latency or with a single port), large-capacity memory to be shared among RGB and for use in the distortion correction. Use of separate memories leads to cost reduction. The system configuration of FIG. 1 is given for illustration of this.

Referring to FIG. 4A, which is a schematic of magnification chromatic aberration correction, pixel data pertaining to RB chrominance components at the positions (pixels) 2(R) and 4(B) is subjected to coordinate transformation to be copied to 3(G), which is the position (pixel) of a G component. The magnification chromatic aberration correction is achieved by performing this operation. Referring to FIG. 4B, which is a schematic of distortion correction, pixel data having undergone the magnification chromatic aberration correction and pertaining to RGB chrominance components at the positions (pixels) 3 is subjected, as one set of data, to coordinate transformation to be copied to the position (pixel) 1, which is the original position. The distortion correction is achieved by performing this operation.

In the example illustrated in FIGS. 4A and 4B, a 3-line, fast memory that processes RGB individually can be satisfactorily used for the magnification chromatic aberration correction. On the other hand, a 5-line memory for the distortion correction is additionally required; however, this memory can be a slow memory to be shared among RGB, which leads to total cost reduction as compared to FIG. 3.

The distortion discussed here denotes distortion of a lens in a projection scheme to be used. Examples of the projection scheme to be used include a projection scheme for obtaining an image as viewed from above a camera and a projection scheme for displaying a portion of an image in an enlarged manner.

Figure 5:
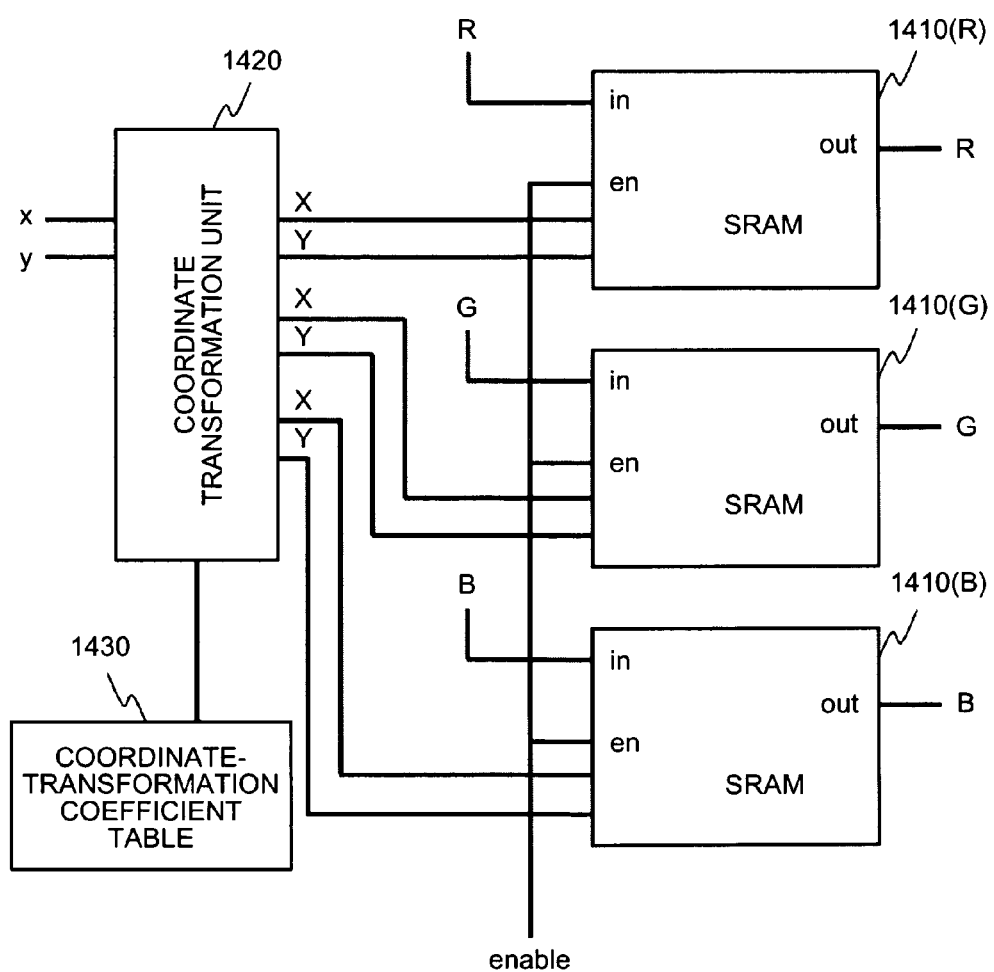
FIG. 5 is a block diagram illustrating the detailed configuration of a magnification-chromatic-aberration correcting unit illustrated in FIG. 1.

FIG. 5 is a schematic configuration diagram of the magnification-chromatic-aberration correcting unit 140. The magnification-chromatic-aberration correcting unit 140 includes coordinate-transformation memories (line buffers) (SRAM) for correcting magnification chromatic aberration, in which 1410(R), 1410(G), and 1410(B) are for an R chrominance component, a G chrominance component, and a B chrominance component, respectively; a coordinate transformation unit 1420 that calculates transformation coordinates for magnification chromatic aberration correction on an individual color basis of RGB based on a predetermined coordinate transformation algorithm; and a coordinate-transformation coefficient table 1430 that stores therein coefficients for use in the coordinate transformation algorithm.

The magnification chromatic aberration correction can be satisfactorily performed with, as a line buffer, a memory having relatively small capacity and yet having either three ports for RGB or low latency. In this example, each of the coordinate transformation memories 1410(R), 1410(G), and 1410(B) is assumed to include an SRAM with capacity of 20 lines on an assumption that a maximum shift amount due to magnification chromatic aberration is 20 lines. The size of the memory in the X-direction depends on the resolution. For example, the size in the X-direction of 640 dots is sufficient when the resolution is equivalent to that of video graphics array (VGA) (640×480). The color depth is 8 bits per color of RGB, and writing and reading from and to each of the coordinate transformation memories 1410(R), 1410(G), and 1410(B) is performed in an 8-bit unit.

Thus, each of the coordinate transformation memories 1410(R), 1410(G), and 1410(B) is small in capacity; therefore, each of the memories desirably includes a 3-port SRAM provided in an image processing chip to ensure a memory area to contain the 20 lines. When the memory is a low-latency memory such as SRAM, a 1-port memory can be used as a 3-port memory in a time sharing manner.

The pixel data of individual colors of RGB having undergone the magnification chromatic aberration is sequentially written to a corresponding one of the coordinate transformation memories 1410(R), 1410(G), and 1410(B) from its first line according to corresponding coordinate values (x, y). When 20 lines of pixel data has been written to each of the memories, pixel data is discarded sequentially from the first line and subsequent lines of pixel data are sequentially newly written to take place of the discarded data. Thus, RGB pixel data, of 20 lines at maximum per memory, that is necessary to perform the coordinate transformation for correcting the magnification chromatic aberration is sequentially stored in each of the coordinate transformation memories 1410(R), 1410(G), and 1410(B).

The coordinate values (x, y) indicate a read-out position of one frame of a captured image. Meanwhile, each of the coordinate transformation memories 1410(R), 1410(G), and 1410(B) is 20-line line buffer in which a line to be written cyclically changes; therefore, it is useless to use the coordinate values (x, y) directly as write addresses on the coordinate transformation memories 1410(R), 1410(G), and 1410(B). Therefore, it is necessary to translate the coordinate values (x, y) into real addresses on the coordinate transformation memories 1410(R), 1410(G), and 1410(B); however, the configuration for this is not illustrated in FIG. 5. The same goes for the relation in reading operation between post-transformation coordinate values (X, Y) and read addresses on the coordinate transformation memories 1410(R), 1410(G), and 1410(B), which will be described later.

The coordinate transformation unit 1420 receives the coordinate values (x, y), which are coordinate-transformation target coordinates, calculates transformation coordinates for magnification chromatic aberration correction on an individual color basis of RGB by using predetermined coordinate transformation algorithm, such as polynomial, and outputs coordinate values (X, Y), which are coordinate-transformation source coordinates on an individual color basis of RGB. As illustrated in FIG. 4A, in the present embodiment, R and B chrominance components are subjected to coordinate transformation to be copied to the position of a G component. Accordingly, while, with regard to the G component, the coordinate transformation unit 1420 that receives an input the coordinate values (x, y) outputs them as the coordinate values (X, Y) without performing transformation, with regard to the R and B chrominance components, the coordinate transformation unit 1420 transforms the thus-input coordinate values (x, y) on an individual color basis of RB by using predetermined coordinate transformation algorithm into the coordinate values (X, Y) and outputs the coordinate values (X, Y). This operation is repeated for each set of coordinate values (x, y).

When an origin is assumed at the center of an image frame, the coordinate transformation algorithm can be expressed with following Equation (1):

$$X=x+[a(1)+a(2)\times abs(x)+a(3)\times abs(y)+a(4)\times y^2]\times x$$

$$Y=y+[b(1)+b(2)\times abs(y)+b(3)\times abs(x)+b(4)\times x^2]\times y \quad (1)$$

where abs( ) is an absolute value of the parameter in ( ), and a(1) to a(4) and b(1) to b(4) are coordinate transformation coefficients. The coordinate transformation coefficients are stored in the coordinate-transformation coefficient table 1430 in advance.

In parallel (in actual, with a delay of a predetermined period of time) with the writing to the coordinate transformation memories 1410(R), 1410(G), 1410(B) mentioned earlier, the RGB pixel data is sequentially read from the coordinate transformation memories 1410(R), 1410(G), 1410(B) according to the coordinate values (X, Y) output from the coordinate transformation unit 1420 (in actual, address-translated values of the coordinate values (X, Y)). In this case, G-component pixel data is read from the coordinate transformation memory 1410(G) at the same position as that where the G-component pixel data has been written. In contrast, each of R-component pixel data and B-component pixel data is read from a corresponding one of the coordinate transformation memories 1410(R) and 1410(B) at a position shifted from the position where the chrominance component pixel data has been written by a predetermined distance; i.e., by an amount of magnification chromatic aberration.

By performing the above operations, the RGB pixel data having undergone the magnification chromatic aberration correction is output from the coordinate transformation memories 1410(R), 1410(G), and 1410(B). Specifically, the RGB pixel data at the coordinate-transformation source coordinate values (X, Y) are output as the RGB pixel data at the coordinate-transformation target coordinate values (x, y).

Figure 6A:
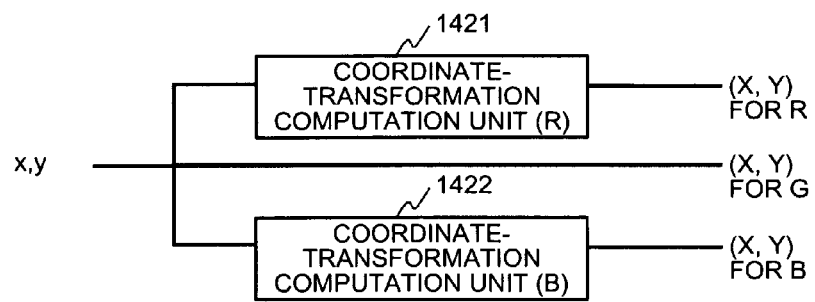
FIGS. 6A to 6C are block diagrams illustrating exemplary configurations of a coordinate transformation unit illustrated in FIG. 5.
Figure 6B:
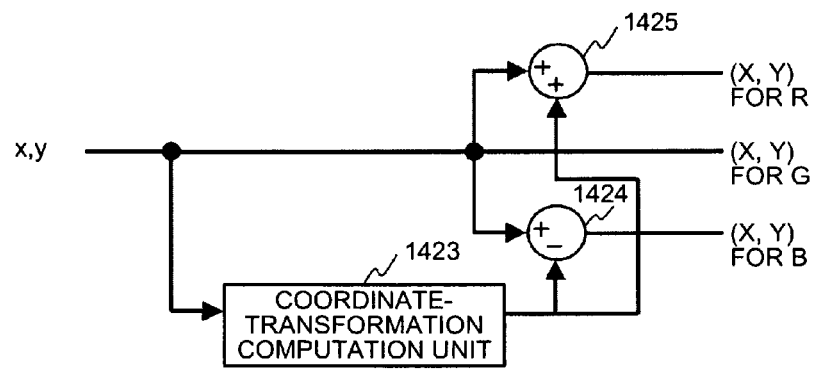
Figure 6C:
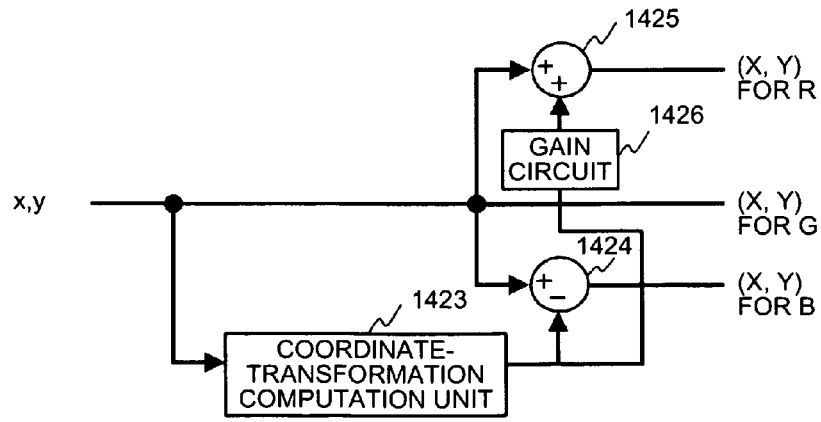

FIGS. 6A to 6C illustrate various exemplary configurations of the coordinate transformation unit 1420. FIG. 6A is an exemplary configuration where a chrominance component for G is not subjected to coordinate transformation and coordinate values (x, y), which are input values, are output as coordinate values (X, Y) for G, while chrominance components for R and B are subjected to coordinate transformation performed by a coordinate-transformation computation unit 1421 for R and a coordinate-transformation computation unit 1422 for (B), respectively, that transform the coordinate values (x, y), which are the input values, to output coordinate values (X, Y) for R and coordinate values (X, Y) for B. Because the coordinate-transformation computation units are provided only for the R and B chrominance components, it is possible to suppress the circuit scale.

FIGS. 6B and 6C illustrate other exemplary configurations devised with a focus given to a fact that R and B chrominance components are generally shifted by magnification chromatic aberration to be substantially symmetrical about a G chrominance component (FIG. 2). FIG. 6B illustrates an exemplary configuration where one coordinate-transformation computation unit 1423 calculates correction amounts for the coordinate values (x, y), a subtracting unit 1424 subtracts the correction amounts from the coordinate values (x, y) to obtain coordinate values (X, Y) for B, while an adding unit 1425 adds the correction amounts to the coordinate values (x, y) to obtain coordinate values (X, Y) for R. On the other hand, the input coordinate values (x, y) for G are output as they are as the coordinate values (X, Y) for G in the same manner as that shown in FIG. 6A.

FIG. 6C depicts an exemplary configuration where a gain circuit 1426 is provided to adjust the correction amounts for R to allow for deviation between symmetrical positions. The exemplary configurations illustrated in FIGS. 6B and 6C have been embodied with only one coordinate-transformation computation unit, leading to further reduction in circuit scale.

A look-up table (LUT) that stores therein correspondence between input coordinate values (x, y) and output coordinate values (X, Y) for each of R and B chrominance components can be provided in place of the coordinate-transformation computation units 1421 and 1422 illustrated in FIG. 6A so that coordinate-transformation source coordinate values (X, Y) corresponding to coordinate-transformation target coordinate values (x, y) can be directly obtained by using the LUT. Similarly, an LUT that stores therein correspondence between input coordinate values (x, y) and correction amounts can be provided in place of the coordinate-transformation computation unit 1423 illustrated in FIGS. 6B and 6C so that correction amounts corresponding to coordinate values (x, y) can be directly obtained by using the LUT. This allows omitting calculations for coordinate transformation, thereby making magnification chromatic aberration correction implementable basically only on memory chip.

Figure 7:
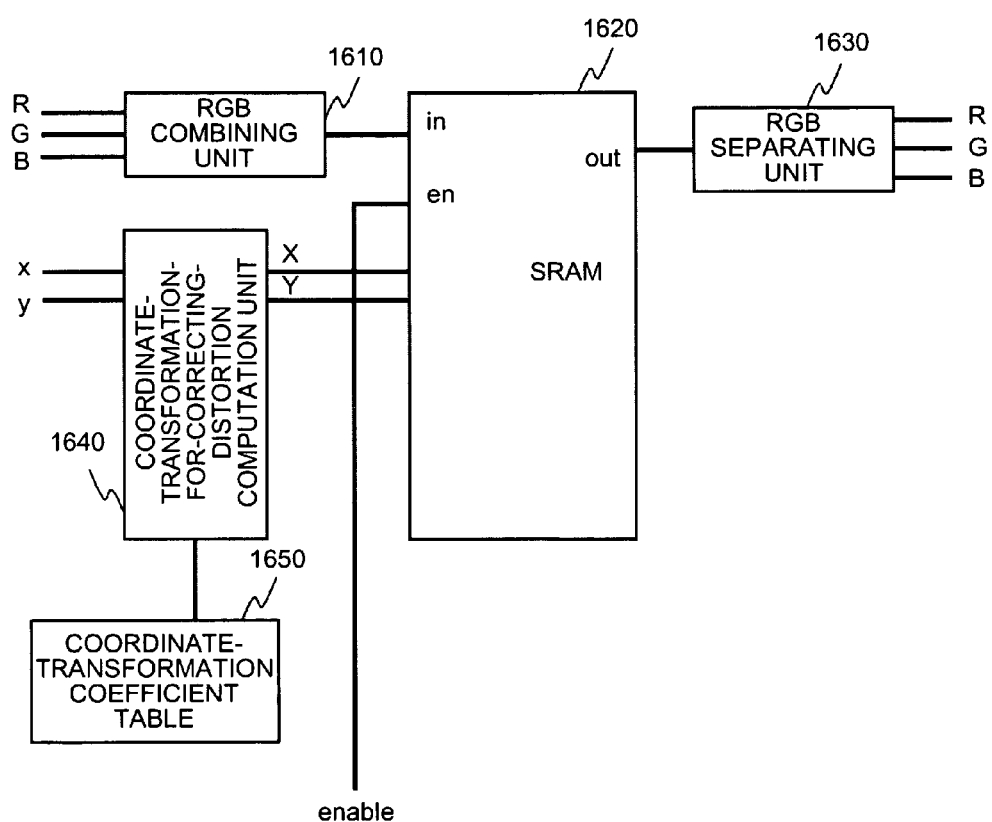
FIG. 7 is a block diagram illustrating the detailed configuration of a distortion correcting unit illustrated in FIG. 1.

FIG. 7 is a detailed configuration diagram of the distortion correcting unit 160. The distortion correcting unit 160 includes an RGB combining unit 1610 that combines three pieces, each corresponding to one color, of RGB pixel data into one data piece; a coordinate transformation memory 1620 (SRAM) that is to be shared among the chrominance components of the RGB pixel data and for use in the distortion correction; an RGB separating unit 1630 that separates the combined RGB pixel data into original chrominance components; a coordinate-transformation-for-correcting-distortion computation unit 1640 that calculates transformation coordinates for the distortion correction of the combined RGB pixel data by using predetermined coordinate transformation algorithm; and a coordinate-transformation coefficient table 1650 that stores therein coefficients to be used with the coordinate transformation algorithm.

Because distortion occurs with a relatively large shift amount, a buffer memory for storing therein pixel data of one image frame at maximum is desirably used to perform the distortion correction. Meanwhile, because the RGB chrominance components are shifted by a single shift amount, a single buffer memory having a bit width equal to a total bit number of the RGB pixel data can be satisfactorily employed. It is assumed that resolution is of the VGA (640×480), the number of bits (color depth) of the RGB pixel data is 8 bits per color of RGB, and the coordinate transformation memory 1620 is a DRAM to and from which writing and reading is performed in a unit of 24-bit, 640×480 dots.

The coordinate transformation memory 1620 that requires a considerably large capacity as mentioned above is difficult to be embodied in the form of an SRAM in an image processing chip in view of cost, and a 1-port memory can be satisfactorily used to handle RGB; therefore, the coordinate transformation memory 1620 is desirably embodied by using a DRAM provided outside the image processing chip.

The RGB combining unit 1610 receives the RGB pixel data (8 bits each) having undergone the magnification chromatic aberration correction, sequentially combines the RGB pixel data into one piece of pixel data (24 bits), and outputs the pixel data. The thus-combined RGB pixel data is sequentially written to the coordinate transformation memory 1620 from its first line according to coordinate-transformation target coordinate values (x, y).

Meanwhile, the coordinate-transformation-for-correcting-distortion computation unit 1640 receives the coordinate-transformation target coordinate values (x, y), calculates transformation coordinates, which are common to RGB, for the distortion correction by using a predetermined coordinate transformation algorithm, such as polynomial, and outputs coordinate-transformation source coordinate values (X, Y). The coordinate transformation algorithm can be expressed as Equation (1), which is the same as that for use in the magnification chromatic aberration correction mentioned earlier. As a matter of course, different coordinate transformation coefficients are to be used. The coordinate transformation coefficients are stored in the coordinate-transformation coefficient table 1650 in advance.

In parallel (to be precise, with a delay of a predetermined period of time) with the writing of the combined RGB pixel data (24 bits) to the coordinate transformation memory 1620 mentioned earlier, combined RGB pixel data is sequentially read from the coordinate transformation memory 1620 according to the coordinate values (X, Y) output from the coordinate-transformation-for-correcting-distortion computation unit 1640. The RGB separating unit 1630 separates the combined RGB pixel data (24 bits) read from the coordinate transformation memory 1620 into its original pixel data of individual R, G, and B components (8 bits each).

As a result of these operations, R pixel data, G pixel data, and B pixel data having undergone the distortion correction are output from the RGB separating unit 1630. Put another way, the R pixel data, the G pixel data, and the B pixel data are copied to the coordinate values (x, y), or their original position.

Also in the case of the distortion correction, an LUT that stores therein correspondence between input coordinate values (x, y) and output coordinate values (X, Y) can be provided so that coordinate-transformation source coordinate values (X, Y) corresponding to coordinate-transformation target coordinate values (x, y) are directly obtained by using the LUT. This allows omitting calculations for coordinate transformation, thereby making distortion correction implementable basically only on memory chip as well.

Figures 8, 9:
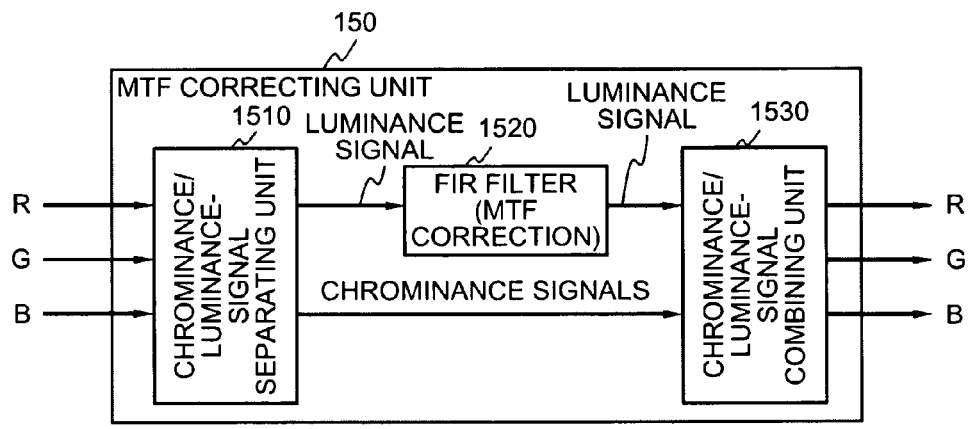
FIG. 8 is a block diagram illustrating the basic configuration of a modulation transfer function (MTF) correcting unit illustrated in FIG. 1.
FIG. 9 is a table that depicts exemplary coefficients for a finite impulse response (FIR) filter.

The MTF correcting unit 150 will be described below. FIG. 8 is a schematic diagram illustrating the basic configuration of the MTF correcting unit 150. In the MTF correcting unit 150, in response to reception of the RGB pixel data having undergone the magnification chromatic aberration correction, a chrominance/luminance-signal separating unit 1510 separates the RGB pixel data into a luminance signal Y and chrominance signals Cb and Cr; an FIR filter (edge enhancement filter) 1520 performs high-frequency enhancement (MTF correction) of the luminance signal Y, and a chrominance/luminance-signal combining unit 1530 combines the luminance signal Y having undergone the high-frequency enhancement with the chrominance signals Cb, Cr, thereby outputting RGB pixel data.

The chrominance/luminance-signal separating unit 1510 separates the RGB pixel data into the luminance signal Y and chrominance signals Cb and Cr by using, for example, the following equations:

$$Y = 0.299R + 0.587G + 0.114B \tag{2}$$

$$Cr = 0.500R - 0.419G - 0.081B \tag{3}$$

$$Cb = -0.169R - 0.332G + 0.500B \tag{4}$$

The FIR filter 1520 typically includes such a 5×5 filter as depicted in FIG. 9, receives only the luminance signal Y among the luminance signal Y and the chrominance signals Cb and Cr, and performs predetermined high-frequency enhancement filtering so that chrominance noise amplification is suppressed by performing high-frequency enhancement filtering (MTF correction) only on the Y signal. This leads to obtainment of a high-quality image.

The chrominance/luminance-signal combining unit 1530 receives the luminance signal Y having undergone the high-frequency enhancement and the chrominance signals Cb and Cr, combines the signals by using the following equations, for example, and outputs RGB pixel data:

$$R = Y + 1.402Cr \qquad (5)$$

$$G = Y - 0.714Cr - 0.344Cb \qquad (6)$$

$$B = Y + 1.772Cb \qquad (7)$$

The present invention is directed to improvement of the FIR filter (edge enhancement filter) 1520. Employment of the FIR filter according to the embodiment of the present invention allows to increase the strength of high-frequency enhancement toward ends of an image frame. It also allows to perform relatively strong edge enhancement specifically in a tangential direction from an image-frame center where it is likely to be optically low. To obtain high-frequency enhancement effect, by using a conventional uniform, a direction-independent uniform filter as illustrated in FIG. 9, that is equivalent to the effect obtained from the embodiment of the present invention, it is necessary to perform considerably strong omnidirectional edge enhancement, which produces a side effect of large noise amplification.

In contrast, according to the embodiment of the present invention, edge enhancement is performed specifically in a tangential direction where optical resolution decreases, thereby also allowing suppression of noise amplification. Meanwhile, the center of an image is not necessarily the strict center of the image; and, for example, the center of an optical axis is adaptable as the center when the center of an image is deviated due to manufacturing tolerance of a lens or the like.

Figure 10:
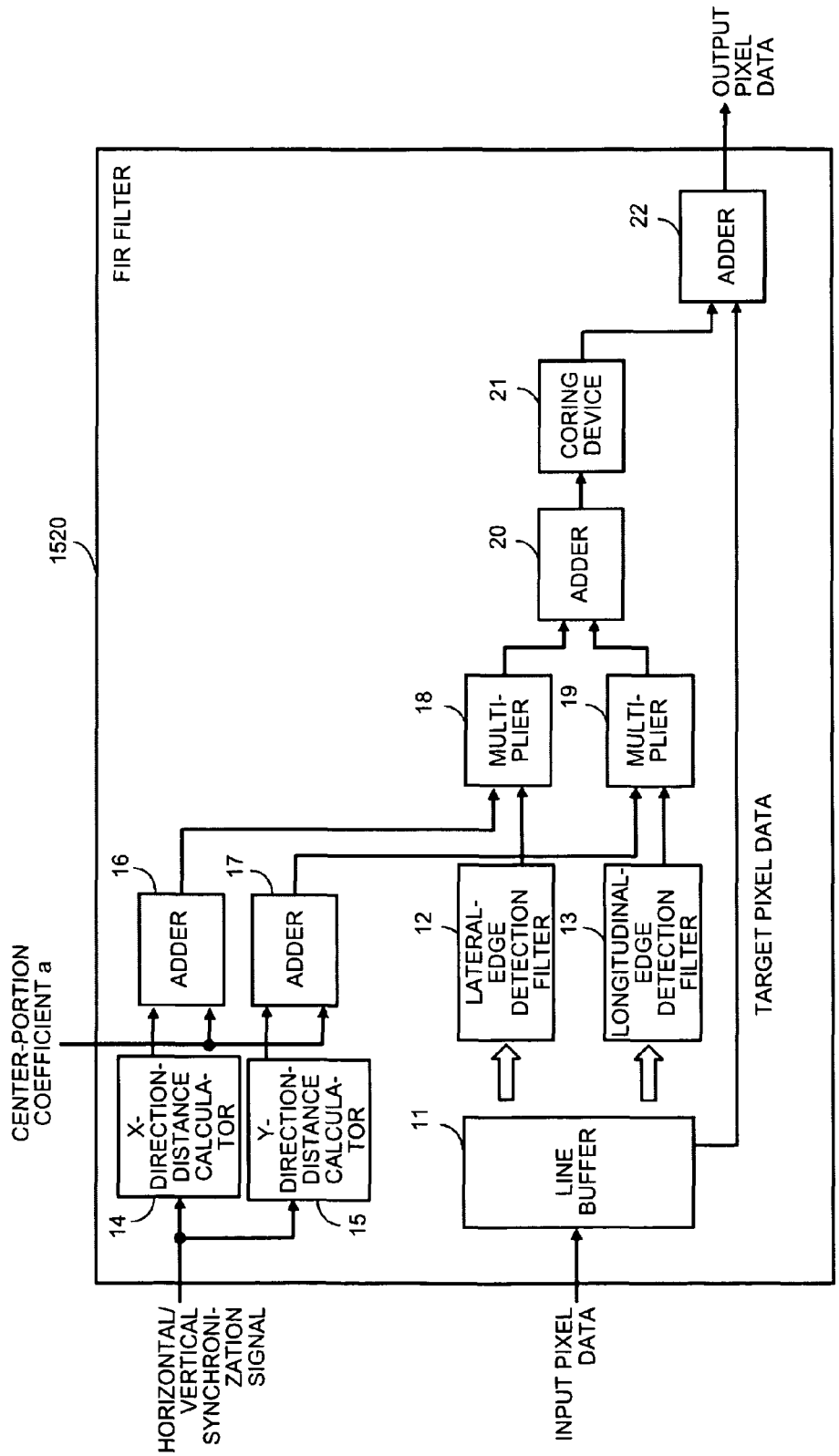
FIG. 10 is a block diagram illustrating an exemplary configuration of an FIR filter illustrated in FIG. 8.

FIG. 10 is a schematic diagram of the configuration of the FIR filter 1520. The input pixel data (luminance signal Y) is sequentially stored in a line buffer 11, and pixel values of a target pixel and a required reference pixel are sent to each of a lateral-edge detection filter 12 and a longitudinal-edge detection filter 13. The pixel value of the target pixel is also sent to an adder 22 simultaneously. The line buffer 11 is formed with an SRAM, or the like, and preferably has a capacity of several lines (for example, five lines) at highest.

Figure 11:
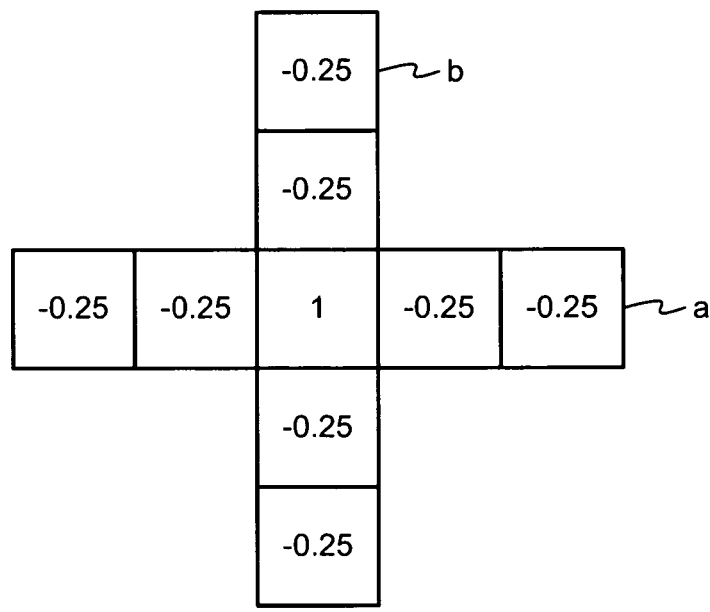
FIG. 11 is a table that depicts exemplary coefficients for longitudinal/lateral-edge detection filters illustrated in FIG. 10.

In response to reception of pixel values of the target pixel and the predetermined reference pixel, the lateral-edge detection filter 12 and the longitudinal-edge detection filter 13 perform lateral (X-direction) edge direction and longitudinal (Y-direction) edge direction, respectively. Examples of coefficients for the lateral-edge detection filter 12 and those for the longitudinal-edge detection filter 13 are given in FIG. 11. The values indicated by "a" in FIG. 11 are example coefficients for the lateral-edge detection filter 12 while the values indicated by "b" are example coefficients for the longitudinal-edge detection filter 13. These coefficient values are desirably varied depending on an employed optical system.

An X-direction-distance calculator 14 and a Y-direction-distance calculator 15 calculates a distance value in the X direction and a distance value in the Y direction between an image-frame center and a target pixel that is currently being filtered in accordance with a lateral synchronization signal and a longitudinal synchronization signal, respectively.

Figure 12:
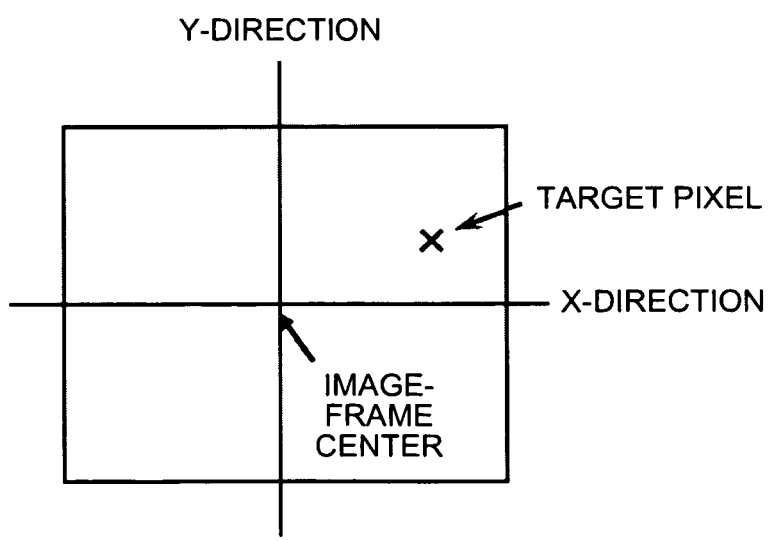
FIG. 12 is a schematic diagram illustrating a relation between an image-frame center and a target pixel.
Figure 13A:
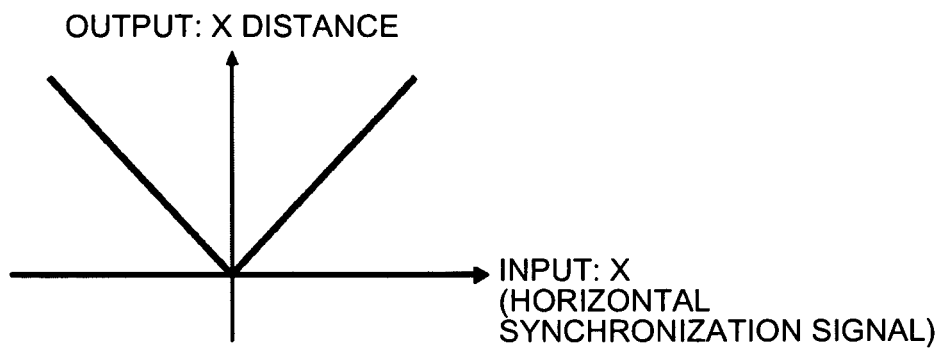
FIGS. 13A to 13C are graphs each depicting exemplary input/output characteristics of a distance calculator.
Figure 13B:
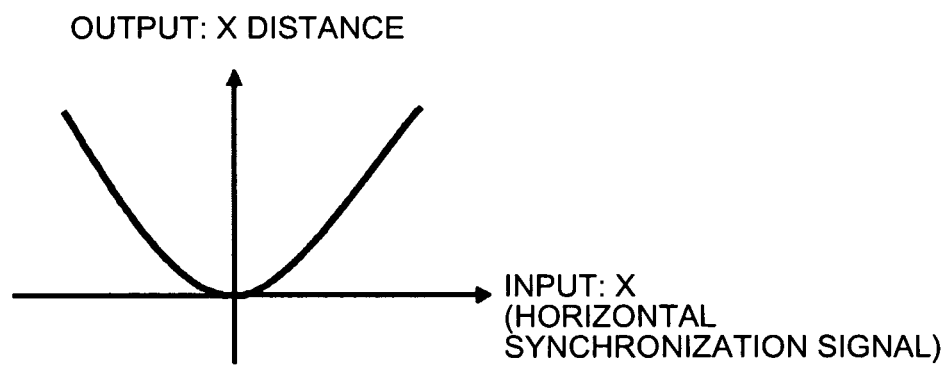
Figure 13C:
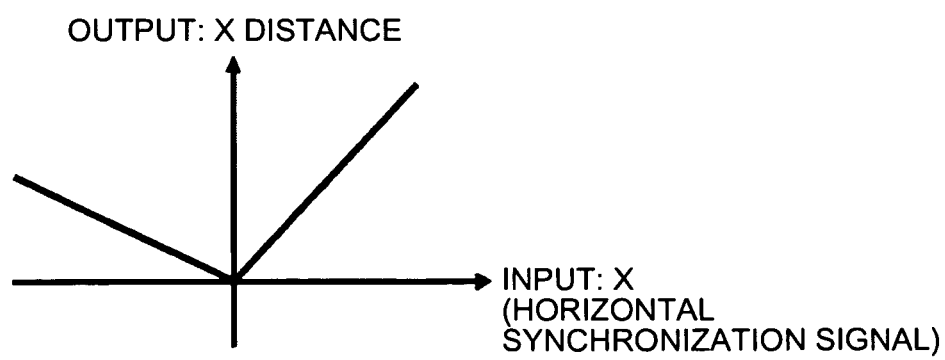

FIG. 12 illustrates a relation between an image-frame center and a target pixel. The image-frame center denotes an optical center of a captured image. The calculation of the distance between the target pixel and the image-frame center can be made from any one of such a simple linear function as given in FIG. 13A and such a secondary or high-order function as given in FIG. 13B depending on the optical system. When it is necessary to correct difference in resolution between a right portion and a left portion, what is called one-side blur, that can be developed by assembly errors of an optical system, as given in FIG. 13C, functions that are asymmetrical about the center of an image can be employed so that strength of edge enhancement applied to the right-hand portion and that to the left portion differ from each other. In this case, the amount of MTF correction that increases toward perimeter can be adjusted by applying an appropriate gain to the distance. Each of FIGS. 13A, 13B, and 13C indicates input-output characteristics of the X-direction-distance calculator 14; and the Y-direction-distance calculator 15 exhibits similar characteristics therewith.

An adder 16 adds a center-portion coefficient "a", which is a predetermined constant, to the value of the X-direction distance between the target pixel and the image-frame center calculated by the X-direction-distance calculator 14. An adder 17 adds a predetermined center-portion coefficient "a", which is the predetermined constant, to the value of the Y-direction distance between the target pixel and the image-frame center calculated by the Y-direction-distance calculator 15. Addition of the center-portion coefficient "a" to each of the X/Y-direction distance values allows to adjust the amount of MTF enhancement to be applied to an image-frame center. Meanwhile, if it is necessary to adjust the amount of MTF enhancement to be applied to the image-frame center, the center-portion coefficient "a" can be set to 0 or the adders 16 and 17 can be omitted.

A multiplier 18 multiplies a detected amount of edge in the X-direction that is calculated by the lateral-edge detection filter 12 by an output value of the adder 16. A multiplier 19 multiplies a detected amount of edge in the Y-direction calculated by the longitudinal-edge detection filter 13 by an output value of the adder 17. Put another way, the multipliers 18 and 19 function to cause gains of the lateral/longitudinal-edge detection filters 12 and 13 to vary depending on the distances between the target pixel and the image-frame center. Interposing the adders 16 and 17 also simultaneously allows adjustment of the amount of MTF enhancement to be applied to the image-frame center.

An adder 20 adds outputs of the multipliers 18 and 19 together to obtain an edge enhancement amount that depends on the distances between the target pixel and the center. If necessary, an output of the adder 20 can be subjected to coring performed by a coring unit 21 for noise amplification suppression. The adder 22 adds the pixel value of the target pixel read from the line buffer 11 to an output of the coring unit 21, thereby obtaining output pixel data.

Figure 14A:
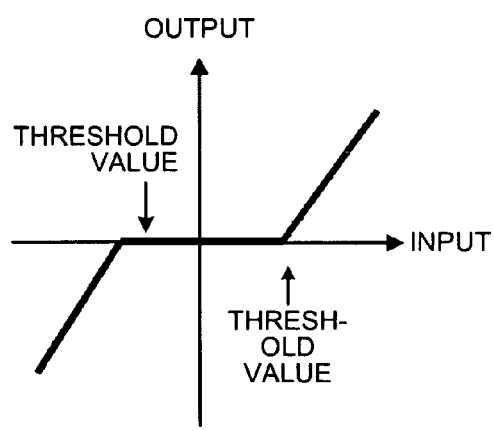
FIGS. 14A and 14B are graphs each depicting exemplary input/output characteristics of a coring unit.
Figure 14B:
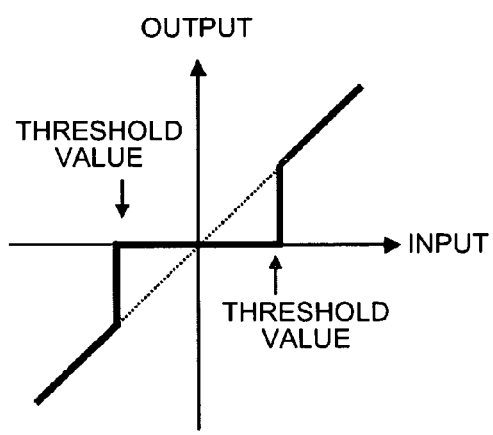

The coring unit 21 has, for example, such input-output characteristics as given in FIGS. 14A and 14B, and functions to suppress noise amplification by cutting off edge components of a predetermined level or lower as noise from the output. Any appropriate one of FIGS. 14A and 14B can be employed. A predetermined threshold value is desirably set to an appropriate value because a high threshold value yields a larger effect in noise reduction; however, the high threshold value can cause unnatural touch to appear in an image and effect of edge detection to decrease.

The coring unit can be provided at a subsequent stage of each of the multipliers 18 and 19. In this case, by setting threshold values of the two coring units to different values, noise amplification can be suppressed appropriately on an individual direction basis.

Figure 15:
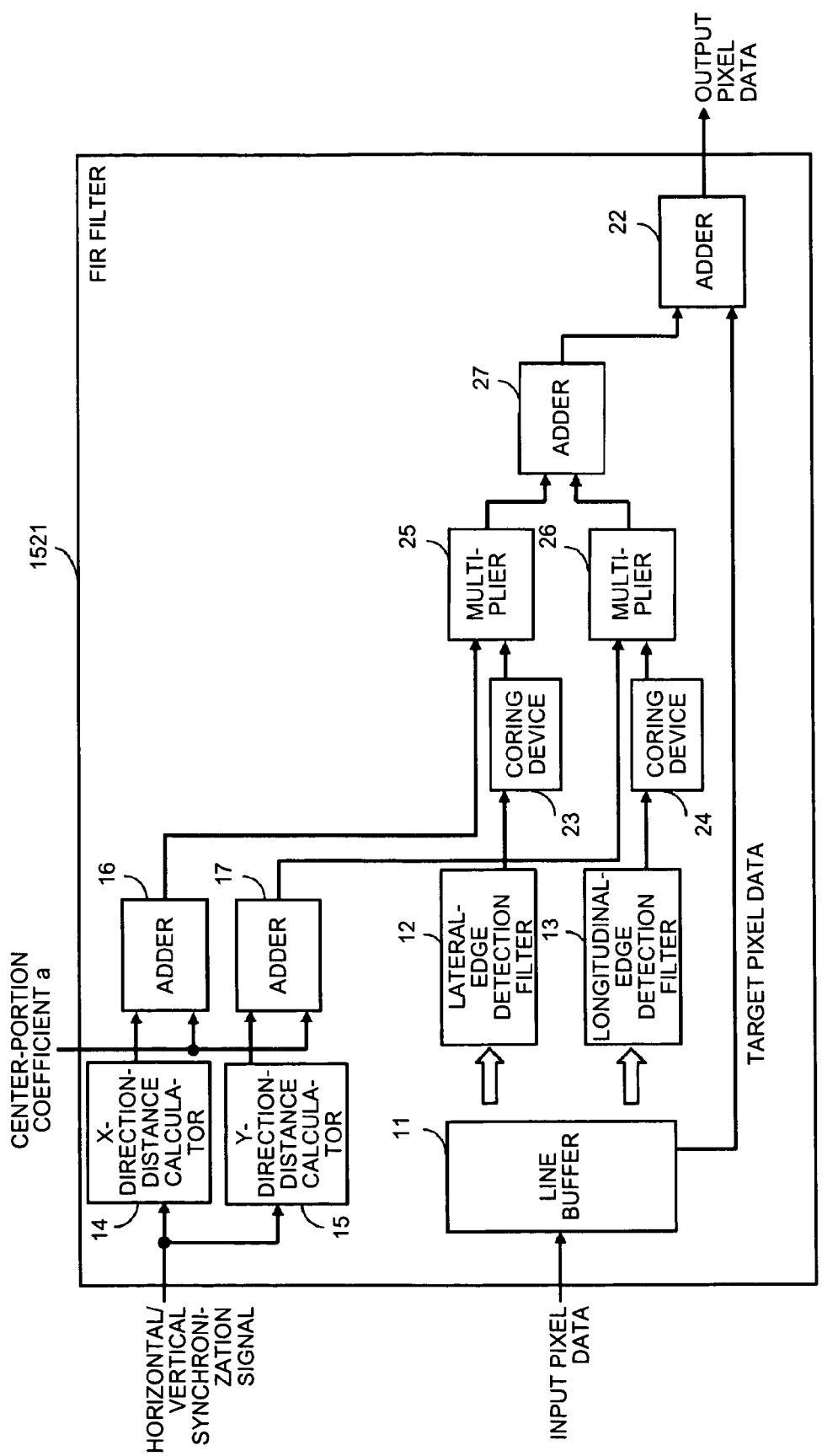
FIG. 15 is a block diagram illustrating another configuration example of the FIR filter illustrated in FIG. 8.

FIG. 15 is a schematic configuration diagram of an FIR filter (edge enhancement filter) 1521 according to another embodiment of the present invention. The FIR filter 1521 can be employed in place of the FIR filter 1520. The FIR filter 1521 differs from the FIR filter 1520 illustrated in FIG. 10 in that coring units 23 and 24 are additionally provided at subsequent stages of the lateral/longitudinal-edge detection filters 12 and 13. The multiplier 25, the multiplier 26, and the adder 27 are equivalent to the multiplier 18, the multiplier 19, and the adder 20, respectively. The remaining configuration is similar to that illustrated in FIG. 10.

With the configuration illustrated in FIG. 15, a threshold value for coring varies depending on a position in an image frame equivalently. Therefore, a larger effect in noise reduction than that obtained from such a configuration, in which threshold value for coring is uniform through an image frame, as illustrated in FIG. 10 is obtained.

In the configuration illustrated in FIG. 10 or FIG. 15, the lateral-edge detection filter and the longitudinal-edge detection filter are combined with the X/Y-direction-distance calculators or the like. This allows to obtain, with circuit of relatively small scale and low power consumption, a similar effect with that obtained from a configuration that causes an image frame to have different filter coefficients at different portions. The edge detection filters are not limited to the lateral direction and the longitudinal direction. An oblique-direction-edge detection filter can be additionally provided. Also in this case, the necessary number of each of a multiplier and the like is only one for each of the directions, and therefore a slight increase in circuit scale and power consumption is involved.

As still another embodiment of the present invention, the FIR filter (edge enhancement filter) of the configuration illustrated in FIG. 10 or FIG. 15 can be provided for each of RGB component signals so that the strength of high-frequency enhancement increases toward ends of an image frame on an individual component signal basis of RGB. Put another way, the MTF correcting unit can have only FIR filters that are individually provided for chrominance components of RGB signals but not having a chrominance/luminance-signal separating unit nor a chrominance/luminance-signal combining unit. The FIR filter of the configuration of FIG. 10 or FIG. 15 can be adopted in its as-is configuration to such a case.

As a matter of course, an image processing method according to an aspect of the present invention can be implemented by configuring computer programs so as to carry out processing functions of the image processing apparatus illustrated in FIG. 1, FIG. 10, or FIG. 15 and causing a computer to execute the computer programs. Alternatively, the image processing method according to an aspect of the present invention can be implemented by configuring computer programs so as to carry out process procedure thereof and causing a computer to execute the computer programs. The computer programs for causing a computer to carry out the processing functions can be stored and/or provided by recording the computer programs in a computer-readable recording medium, such as a flexible disk (FD), a magneto-optical disk (MO), a read only memory (ROM), a memory card, a compact disc (CD), a digital versatile disc (DVD), and a removable disk, and/or distributed via a network such as the Internet.

The invention claimed is:

1. An image processing apparatus comprising edge-enhancement filter unit that enhances sharpness of an image, wherein the edge-enhancement filter unit includes:
a distance calculating unit configured to calculate distance values, which are values of a distance between a target pixel and an optical center of a captured image in at least two axial directions including a first axial direction and a second axial direction;
an edge detection filter corresponding to each of the axial directions, wherein each of the edge detection filter is configured to detect an edge amount in a corresponding one of at least two directions on an direction-by-direction basis, the at least two directions including the first axial direction and the second axial direction;
a multiplying unit corresponding to each of the edge detection filters, wherein each of the multiplying units is configured to multiply the edge amount detected at a corresponding one of the edge detection filters by the distance value calculated by the distance calculating unit for a corresponding one of the axial directions, including a first multiplying unit configured to multiply the edge amount detected in the first axial direction by the edge detection filter by the distance value in the first axial direction calculated by the distance calculating unit and a second multiplying unit configured to multiply the edge amount detected in the second axial direction by the edge detection filter by the distance value in the second axial direction calculated by the distance calculating unit;
a first adding unit that adds up outputs of the multiplying units together; and
a second adding unit configured to add a pixel value of the target pixel to an output of the first adding unit.

2. The image processing apparatus according to claim 1, wherein the edge detection filters are two in number, one of the edge detection filters detects edge in a lateral direction of an image frame and other one of the edge detection filters detects edge in a longitudinal direction of the image frame.

3. The image processing apparatus according to claim 1, wherein the edge-enhancement filter unit further includes, at a subsequent stage of the first adding unit, a coring unit that outputs zero when the output of the first adding unit is equal to or lower than a predetermined threshold value.

4. The image processing apparatus according to claim 1, wherein the edge-enhancement filter unit further includes, at a subsequent stage of each of the multiplying unit, a coring zero when an output of a corresponding one of the multiplying unit is equal to or lower than a predetermined threshold value.

5. The image processing apparatus according to claim 1, wherein the edge-enhancement filter unit further includes, at a subsequent stage of each of the edge detection filters, a coring unit that outputs zero when an output of a corresponding one of the edge detection filters is equal to or lower than a predetermined threshold value.

6. The image processing apparatus according to claim 1, wherein the edge-enhancement filter unit further includes, at a subsequent stage of the distance calculating unit, a third adding unit corresponding to each of the axial directions configured to add a constant value to an output of the distance calculating unit.

7. The image processing apparatus according to claim 1, wherein outputs of the distance calculating unit are asymmetrical about a center of the image.

8. The image processing apparatus according to claim 1, further comprising, at a preceding stage of the edge-enhancement filter unit, a chrominance/luminance separating unit that separates image data into chrominance signals and a luminance signal, wherein the edge-enhancement filter unit receives the luminance signal and performs edge enhancement on the luminance signal.

9. The image processing apparatus according to claim 1, wherein the image is captured by using a wide-view-angle optical system.

10. An image processing method comprising an edge-enhancement filtering step of enhancing sharpness of an image, wherein
the edge-enhancement filtering step includes:
a distance calculating step of calculating distance values, which are values of a distance between a target pixel and an optical center of a captured image in at least two axial directions including a first axial direction and a second axial direction;
an edge-detection filtering step of detecting edge amounts in at least two directions on an direction-by-direction, the at least two directions including the first axial direction and the second axial direction;
a multiplying step of multiplying each of the edge amounts detected at the edge-detection filtering step, which is detected in a corresponding one of the axial directions, by one of the distance values calculated at the distance calculating step, the multiplying step including multiplying the edge amount detected in the first axial direction by the edge-detection filtering step by the distance value in the first axial direction calculated by the distance calculating step and multiplying the edge amount detected in the second axial direction by the edge detection-filtering step by the distance value in the second axial direction calculated by the distance calculating step;
a first adding step of adding multiplication results obtained at the multiplying step together; and
a second adding step of adding a pixel value of the target pixel to an output of the first adding step.

11. The image processing method according to claim 10, wherein the edge-detection filtering step includes calculating edge in two directions of a lateral direction and a longitudinal direction of an image frame.

12. The image processing method according to claim 10, wherein the edge-enhancement filtering step includes, after the first adding step, a coring step of outputting zero when the output of the first adding step is equal to or lower than a predetermined threshold value.

13. The image processing method according to claim 10, wherein the edge-enhancement filtering step includes, after the multiplying step, a coring step of outputting zero when an output for a corresponding one of the directions at the multiplying step is equal to or lower than a predetermined threshold value.

14. The image processing method according to claim 10, wherein the edge-enhancement filtering step includes, after the edge detection filtering step, a coring step of outputting zero when an output of a corresponding one of the direction at the edge-detection filtering step is equal to or lower than a predetermined threshold value.

15. The image processing method according to claim 10, wherein the edge-enhancement filtering step further includes, after the distance calculating step, a third adding step of adding a constant value to each output at the distance calculating step.

16. The image processing method according to claim 10, wherein outputs of the distance calculating steps are asymmetrical about a center of the image.

17. The image processing method according to claim 10, further comprising, before the edge-enhancement filtering step, a chrominance/luminance separating step of separating image data into chrominance signals and a luminance signal, wherein the edge enhancement filtering step includes performing edge enhancement on the luminance signal.

18. The image processing method according to claim 10, wherein the image is captured by using a wide-view-angle optical system.

19. An on-vehicle camera apparatus comprising:
a wide-view-angle optical system;
an imaging device that reads an image captured at the wide-view-angle optical system;
the image processing apparatus according to claim 1 configured to process the image read by the imaging device to output a processed image; and
a display device that displays the processed image.

* * * * *